Patented June 14, 1927.

1,632,617

UNITED STATES PATENT OFFICE.

STUART B. MOLONY, OF CONSHOHOCKEN, PENNSYLVANIA, AND YASUJURO NIKAIDO, OF BAY CITY, MICHIGAN, ASSIGNORS, BY MESNE ASSIGNMENTS, TO CHARLES W. BROWN, WILLIAM L. CLAUSE, AND EDWARD PITCAIRN, OF PITTSBURGH, PENNSYLVANIA.

RUBBER VULCANIZATION AND PRODUCTS THEREOF.

No Drawing. Application filed April 12, 1920, Serial No. 373,368. Renewed December 18, 1926.

The invention relates to the vulcanization of rubber or caoutchouc. It has for its principal objects the provision of a process whereby the rapidity of vulcanization can be increased, whereby the time or temperature of vulcanization can be lessened, which can be practiced at a minimum of expense with a relatively small quantity of the accelerating agent, and the provision of a product which is of superior quality and durability.

In its broadest form the invention contemplates the use of aromatic substituted dithiocarbamic compounds. More specifically, the invention contemplates the use of possible modifications of metal salts of dithiocarbamic acid, set forth in the patent to Y. Nikaido, No. 1,513,122, and the use of modifications of the compounds set forth in the patent to Stuart B. Molony, No. 1,558,707, which are suitable for the purpose. Such modifications are accomplished by the substitution of elements, groups, or radicals, either in the place of the metals of the salts, or the hydrogen of the acids, or in place of the hydrogen or alkyl of the amido group, or both; for instance, in the first case the substitution for the hydrogen of the acid or for the metals of the metallic salts, of other elements or groups such as aromatic groups including phenyl, naphthalene, anthracene, etc., thus forming corresponding salts, i. e., esters, of the dithiocarbamic acids; and in the second case, in the amido group, the substitution for the hydrogen or alkyl groups, of other elements or groups, such as phenyl, anthracene, pyridine, cyanogen, the various chlorides, etc., which can be substituted for the hydrogen of the amido group, either in the acids or in the metallic salts or esters.

The esters of the aromatic dithiocarbamic acids can be prepared from the amino ammonium salts of the same acid by treatment with iodophenyls, etc., when the base forming amino ammonium group $NH_2(CH_3)_2$ or $NH_3(CH_3)$, is replaced by the phenyl, etc., groups; or the base forming $NH_3(C_6H_5)$ group, etc., can be replaced in the same way. The esters can also be prepared from chlorodithiocarbonic esters and amines.

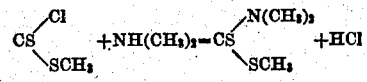

The replacement of the alkyl groups in the amido group by hydrogen, phenyl naphthalene, pyridine, etc., can be accomplished by the regular methods for effecting substitutions in the amido group.

Aniline salt of phenyl dithiocarbamic acid may be prepared by mixing ten parts of carbon bisulphide, twenty parts of analine and five parts of ethyl alcohol and leaving the mixture in a current of cool dessicated air until all the alcohol and excess of carbon bisulphide are evaporated, when the liquid becomes nearly odorless. This liquid is aniline salt of phenyl dithiocarbamic acid which was formed according to the following equation:

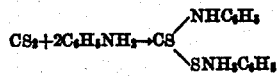

This compound is very unstable and when treated with 75% alcohol saturated with zinc sulphate, zinc salt of phenyl dithiocarbamic acid is precipitated. This salt is quite stable as repeated washings with water has no effect upon the composition of the compounds. It may be washed with water, filtered, and dried in a current of warm dry air. Other metallic salts of phenyl dithiocarbamic acid may be obtained in the like manner.

Methyl ester of phenyl dithiocarbamic acid may also be obtained by mixing phenyl mustard oil and methyl mercaptan according to the following equation:

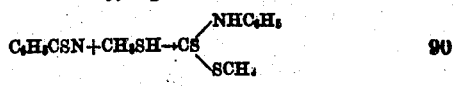

The advantages to be derived from some of these substitutions are the wide range they give in the melting point not possible in the acid or metallic salts, as these are all of comparatively high melting points; and also the greater ease of manufacture.

The methods of use of the various accelerating agents herein set forth, as to the quantity employed, the time of vulcanization, the heat required and the proportions of zinc oxide, sulphur and other ingredients vary widely. As a specific illustration, we have found that the methyl ester of dimethyl dithiocarbamic acid, whose production has been described herein, may be used in substantially the same way and in the same proportions as the mixture of monomethyl dithiocarbamate of zinc and dimethyl dithiocarbamate of zinc described in said Patent No. 1,513,122 to Y. Nikaido, the formula being:

100 parts by weight of smoked Ceylon.
50 parts by weight of zinc oxide.
5 parts by weight of sulphur.
⅕ parts by weight of accelerating agent.

With steam pressure of 50 pounds in a press, a good cure will be obtained in about ten minutes. At three pounds steam pressure a good cure will be obtained in a press in about forty-five minutes.

The terms, "aromatic substituted dithiocarbamate" and "aromatic disubstituted dithiocarbamate" as used in the claims, are intended to include the substituted dithiocarbamates containing a heterocyclic radical having an aromatic constituent.

What we claim is:

1. The process of accelerating the vulcanization of rubber by the use of the phenyl ester of phenyl dithiocarbamic acid.

2. The process of vulcanizing rubber comprising combining with the same a vulcanizing agent and an accelerator comprising an aromatic disubstituted dithiocarbamate.

3. Vulcanized rubber having as an ingredient before vulcanization an aromatic disubstituted dithiocarbamate.

4. The process of vulcanizing rubber comprising combining with the same a vulcanizing agent and an accelerator comprising an aromatic substituted dithiocarbamate.

5. Vulcanized rubber having as ingredient before vulcanization an aromatic substituted dithiocarbamate.

STUART B. MOLONY.
YASUJURO NIKAIDO.